CIRCUITS OF THE MONOSTABLE AND BISTABLE TYPE EMPLOYING TRANSISTORS AND NEGATIVE RESISTANCE DIODES

Filed Jan. 13, 1960 2 Sheets-Sheet 1

INVENTOR.
George H. Wells
BY John V. Regan
ATTORNEY

INVENTOR.
George H. Wells
BY John V. Regan
ATTORNEY

United States Patent Office 3,229,113

Patented Jan. 11, 1966

3,229,113

CIRCUITS OF THE MONOSTABLE AND BISTABLE TYPE EMPLOYING TRANSISTORS AND NEGATIVE RESISTANCE DIODES

George H. Wells, Conshohocken, Pa., assignor to Radio Corporation of America, a corporation of Delaware Filed Jan. 13, 1960, Ser. No. 2,249
6 Claims. (Cl. 307—88.5)

The present invention relates to new and improved circuits which, while not restricted thereto, are especially useful in computers.

Transistors have found numerous applications in logic circuits for computers. Generally, the transistor produces an output at one level to indicate the binary digit one and at another level to indicate the binary digit zero. However, transistors, especially cheap transistors, have an inherent disadvantage. The transistor is subject to drift in response to ambient operating conditions, such as temperature, and changing circuit parameters as, for example, due to aging of components. Since in computer circuits many transistor stages may be connected in cascade, small amounts of drift in early stages may be amplified substantially by the following stages and cause computational errors. For example, such amplified signals may cause a stage which should be producing an output representative of the binary digit zero to switch and produce one representative of the binary digit one.

An object of the present invention is to provide an improved transistorized computer circuit which is not subject to drift at low values of input signal.

Another object of the present invention is to provide new and improved two state circuits of the bistable and monostable type.

Another object of the invention is to provide computer circuits of relatively low cost, small size and little power dissipation.

According to the invention, a negative resistance diode is connected in parallel with the base-to-emitter diode of a transistor. When the negative resistance diode is in its low state, the transistor conducts little or no current and a transistor output signal of one value is produced. When the negative resistance diode is switched to its high state, the transistor conducts a substantial amount of current and produces an output signal of another value. The negative resistance diode may be operated in bistable or monostable fashion. In the latter mode of operation, the diode automatically resets to its low voltage state so that the transistor output signal automatically returns to its one value.

The invention will be described in greater detail by reference to the following description taken in connection with the accompanying drawing in which:

FIG. 3 is a characteristic curve of current versus voltage for a negative resistance diode;

Figure 1:
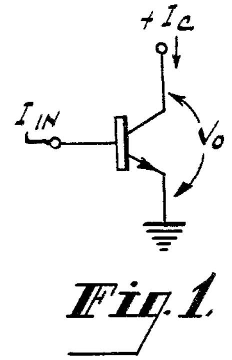
FIG. 1 is a schematic circuit diagram of a transistor circuit.
Figure 2:
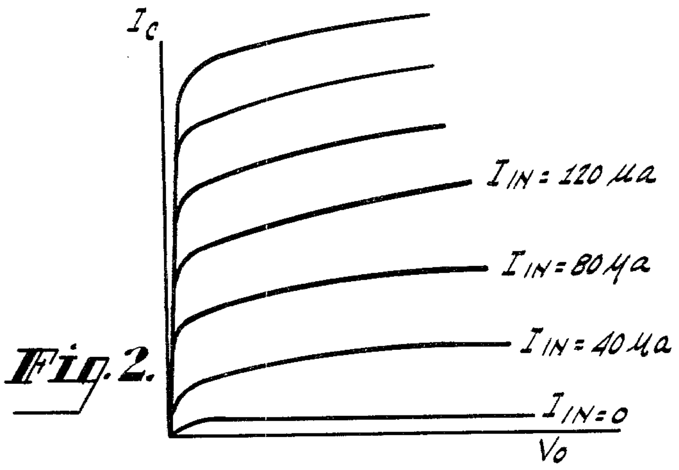
FIG. 2 is a family of curves of collector current versus collector-to-emitter voltage for the transistor of FIG. 1.

FIG. 1 shows a NPN transistor. The family of curves of FIG. 2 is obtained by maintaining the base current $I_{in}$ of the transistor of FIG. 1 fixed at one value and then varying the collector voltage. The base current is then changed in a discrete step to another value and the collector voltage $V_c$ varied in the same manner to obtain the other curves. It may be observed that output currents $I_c$ are obtained with very low values of input current. These output currents are subject to change with changing ambient conditions and circuit parameters and this may be highly disadvantaegous in computer applications, as already mentioned.

FIG. 3 is a characteristic curve of current versus voltage for a forward biased negative resistance diode. Such diodes, sometimes also known as tunnel diodes, are described in an article by Sommers in the Proceedings of the IRE, July 1959, page 1201. The value of the current peak is not shown in the graph as it may vary according to the material used, the doping, etc., from a value of less than a milliampere to a value of upwards of 50 milliamperes. The peak *b* may occur at a voltage of about 50 millivolts.

Figures 4, 5, 6, 7:
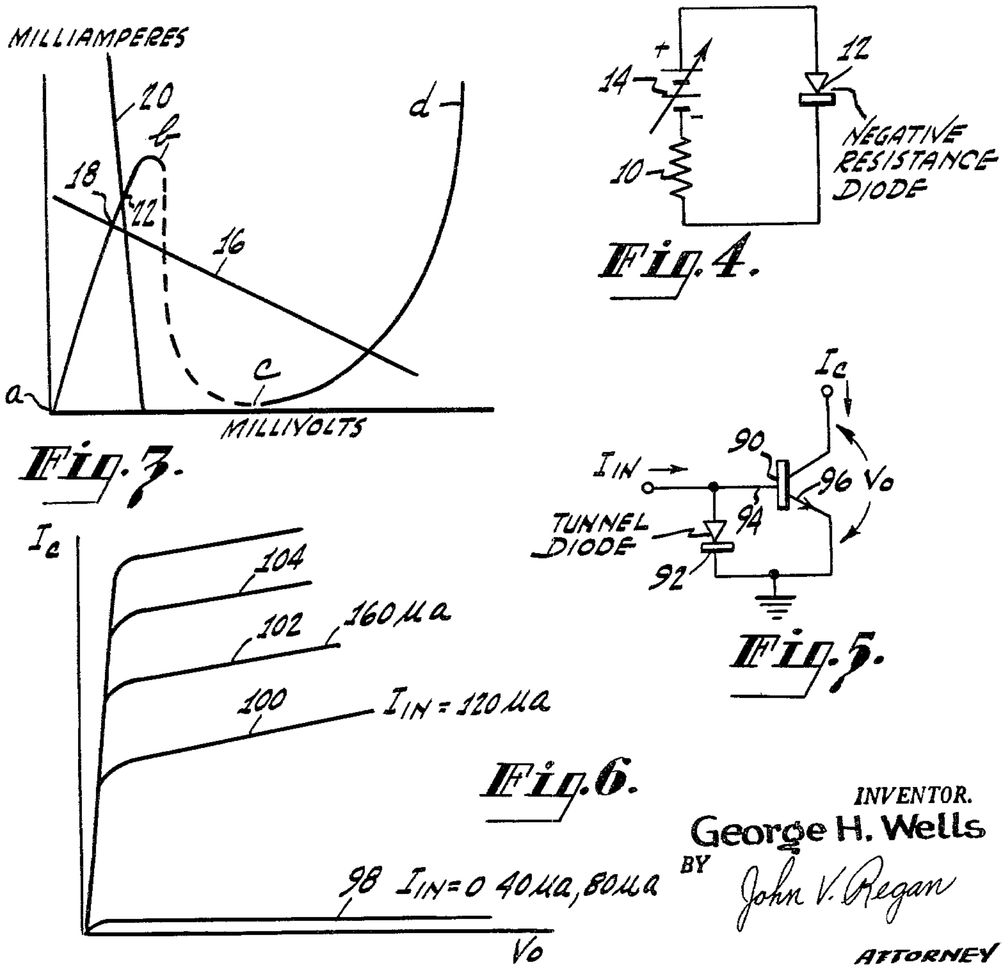
FIG. 4 is a simple circuit for explaining the curve of FIG. 3.
FIG. 5 is a schematic circuit diagram of a simplified circuit according to the present invention.
FIG. 6 is a family of curves of collector current versus emitter-to-collector voltage for the circuit of FIG. 5.
FIG. 7 is a schematic circuit diagram of a bistable circuit according to the present invention.
Figure 7:
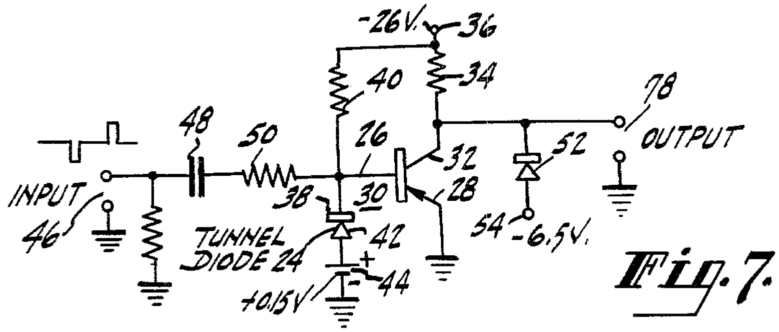

The portions *ab* and *cd* of the curve of FIG. 3 may be obtained with a circuit like the one shown in FIG. 4. It includes a resistor 10 in series with a negative resistance diode 12 and a source of voltage 14 connected across the series circuit. It may be assumed first that the value of resistance 10 is many times higher than that of diode 12 so that the source 14 and resistor 10 together act substantially like a constant current source. If the current through the diode 12 is varied as, for example, by varying the source voltage 14 first increasing from zero to a maximum positive value and then returning to zero, the curve shown in solid lines in FIG. 3 is obtained. The portions *ab* and *cd* of the curve are regions of positive resistance. In other words, the inverse of the slope, *dE/dI*, is a positive quantity. The region *bc* of the curve is not observable using the plotting technique described and is therefore shown by dashed line. Nevertheless, the region *bc* is known to have a slope such as shown and is accordingly termed a negative resistance region.

The load line for resistor 10 of the circuit of FIG. 4 may be as shown at 16. If the circuit is quiescently operating at the intersection 18 of the load line and the positive resistance region *ab* and the current through the diode is increased to a value beyond that represented by point *b*, the diode rapidly switches to the high voltage state and operates at the point represented by the intersection of the shifted load line 16 and the positive resistance region *cd*. Conversely, if after the diode is in the high voltage state *cd*, the current through the diode is reduced to a value lower than that represented by point *c*. The diode swiches back to its low voltage state *ab*.

If the constant-current source 14, 10 of FIG. 4 is replaced with a constant-voltage source, the load line is as indicated at 20. There is only one intersection 22 between the load line and positive resistance region *ab*. If a current pulse is applied to the diode to switch it to its high state, the diode will return to its low voltage state after the pulse is removed.

The circuits described above have certain limitations in practice. For example, the diode is capable of supplying only a limited amount of power. With a load line like 16 in FIG. 3, for example, the current available in the high voltage state is relatively low and the diode therefore cannot drive very many additional diodes. Another limitation is the bilateral signal propagating characteristics of the diode. The input terminal of the diode is the same as its output terminal and therefore if a stage driving the diode assumes a lower voltage than the diode itself, the diode may feed its signal back toward the driving stage rather than in the correct direction. Also, the diode may receive an undesired signal from another diode driven by it or in from another diode in a parallel signal path and be switched by this undesired signal.

There are available bistable and monostable circuits using two transistors which are not subject to the disadvantages of the tunnel diode circuits discussed above. However, the cost of the two transistor circuits is relatively high. The space required for the two transistors is relatively large compared to that of the circuit to be described. The power dissipation of the two transistor circuits is relatively high. Finally, the two transistor circuits require a relatively large number of associated circuit elements, particularly when used at high speed, say 100 megacycles or so.

A simplified circuit according to the present invention which incorporates advantageous characteristics both of the tunnel diode and the transistor is shown in FIG. 5. The circuit includes a transistor 90 and a tunnel diode 92 connected in parallel, like electrode to like electrode, with the base 94 to emitter 96 diode of the transistor. ("Parallel" connection, as used here, implies a division of input current $I_{in}$ between the tunnel diode and the base-to-emitter diode.) The operation of this circuit is illustrated in FIG. 6. It may be assumed that the particular diode 92 employed has a current peak of about 100 microamperes. In other words, if a current of greater than 100 microamperes is applied to the diode, the diode will switch from its low state to its high state. As can be seen from FIG. 6, at 0, 40, and 80 microamperes, substantially the entire input current passes through the tunnel diode and substantially none of it passes to the base 94 to emitter 96 diode. Accordingly, the emitter-to-collector current $I_c$ remains substantially constant at a very low value as is indicated by curve 98. When, however, the input current exceeds the current peak of the tunnel diode, the diode suddenly switches from its low state to its high state. The maximum voltage across the diode, when in its low state, may be of the order of 50 millivolts or so. When the diode switches to its high state, the voltage across it may assume a value of 400 millivolts. At this higher voltage value, the emitter-to-base diode of the transistor is forward biased to a substantial extent and substantial emitter-to-collector current flows as indicated by curve 100. As the input current to the circuit is increased further, the voltage across the diode remains substantially constant (between about 400 and 450 millivolts) and the emitter-to-collector current increases as is indicated by curves 102, 104, etc.

In the circuit of FIG. 5, the anode of a tunnel diode is connected to the base of a NPN transistor. It is to be understood that a PNP transistor may be used instead in which case the cathode of the tunnel diode is connected to the base. A circuit of this type is shown in FIG. 7. A practical bistable circuit incorporating the invention is shown in FIG. 7. A tunnel diode 24 is connected in parallel with the base 26 to emitter 28 diode of a transistor 30. The collector 32 of the transistor is connected through a relatively large resistor 34 to a terminal 36 to which a negative D.C. voltage may be applied. The cathode 38 of the tunnel diode is connected through a relatively large coupling resistor 40 to terminal 36 and the anode 42 of the tunnel diode through a small bias battery 44 to ground completing the emitter-to-base circuit. The input terminal 46 is connected to the common transistor base, tunnel diode cathode connection through a coupling capacitor 48 and coupling resistor 50. A conventional positive resistance diode 52 is connected between the collector 32 and a terminal 54 to which a negative clamping voltage may be applied.

Figure 8:
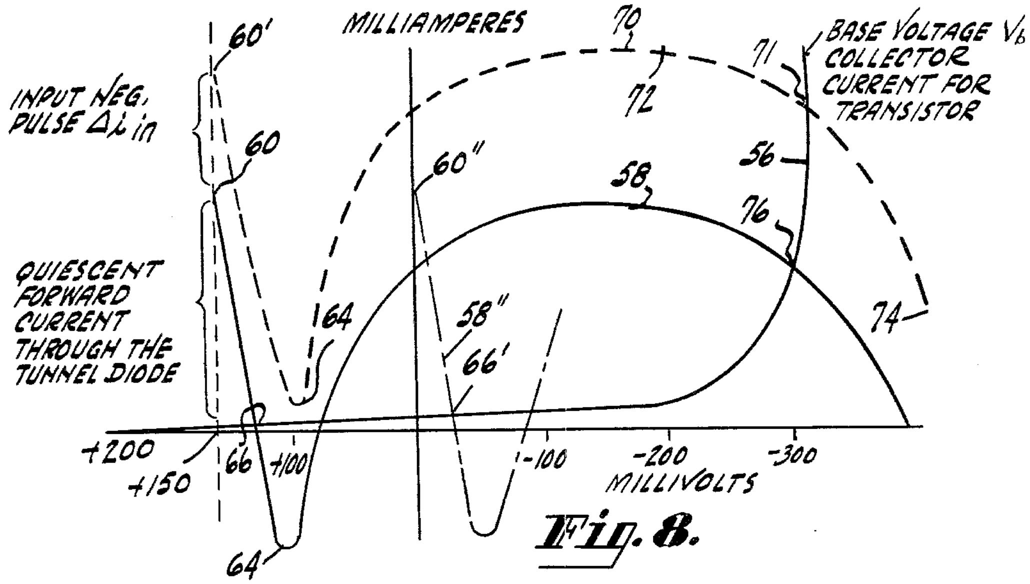
FIG. 8 is a characteristic curve of current versus voltage of the circuit of FIG. 7.

The operation of the circuit of FIG. 7 may be better understood by referring to FIG. 8. The base voltage versus collector current characteristic for transistor 30 is shown at 56. The tunnel diode and battery 44 can be considered as a load in shunt with the emitter-to-base diode of the transistor. When so considered, the tunnel diode characteristic is rotated 180° in the plane of the drawing and is as shown at 58 in FIG. 8. The starting point 60 for the tunnel diode load line now occurs at a point determined by the quiescent current through the diode and the voltage applied by battery 44. This voltage is shown as 150 millivolts positive.

The low voltage operating region 60, 64 intersects the transistor characteristic at point 66. This means that the negative resistance diode is in its low voltage state and is drawing an appreciable amount of current and that the base 26 of the transistor has a positive voltage (about 120 or 130 millivolts) applied with respect to its emitter. Thus, the base-to-emitter diode is reverse biased and substantially no current flows in the emitter-to-collector circuit of the transistor.

If now a negative pulse of sufficient amplitude is applied to terminal 46, negative resistance diode 24 is switched from its low to its high state. The current increment may be represented by 60, 60′ in FIG. 8 and the effect of the current increment is to shift load line 58 in the upward direction as is indicated by dashed curve 70. It may be observed that the dashed curve does not intersect the transistor characteristic 56 in the low voltage operating region 60′, 64′. It does, however, intersect the transistor characteristic at point 71 which is in the high voltage operating region 72, 74 of the tunnel diode. When the negative pulse terminates, the load line returns from 70 to 58 and the operating point is then at 76. At both operating points 71 and 76 a substantial amount of current flows in the emitter-to-collector circuit of the transistor and an output voltage appears at output terminals 78 (FIG. 7).

In the circuit of FIG. 7, a bias battery 44 is connected to the anode of the negative resistance diode. The circuit can operate without the bias battery, in which case the load line 58 is shifted to the right (a part of the shifted curve is shown at 58″) and intersects the zero voltage axis at point 60″ (FIG. 8). Under these circumstances, operating point 66 shifts to 66′ (FIG. 8). Now the base-to-emitter diode is forward biased, however, the forward base current is insignificant and accordingly the transistor emitter-to-collector current is insignificant.

The bistable circuit of FIG. 7 may be switched back to its first stable state by applying a positive pulse to terminal 46 of sufficient amplitude to switch tunnel diode 24 back to its low voltage state.

Figure 9:
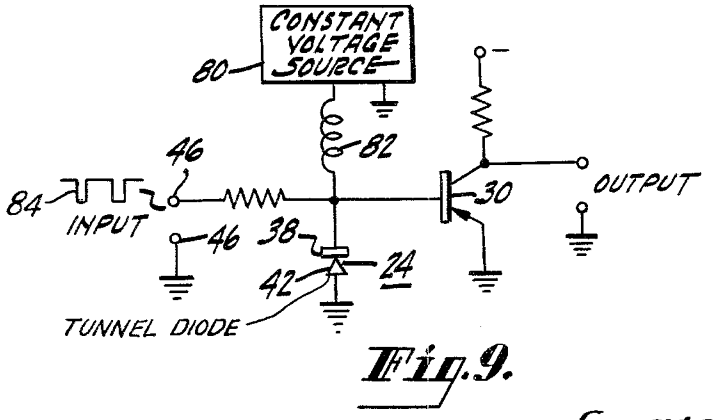
FIG. 9 is a block and schematic circuit diagram of a monostable circuit according to the present invention.

An embodiment of the invention which operates monostably is shown in FIG. 9. Elements similar in structure and function to like elements of FIG. 7 have the same reference numerals applied. The principal difference between the circuits is that a quiescent constant forward voltage (rather than current) is applied from constant voltage source 80 through an inductor 82 to the cathode 38 of tunnel diode 24. The load line for the tunnel diode is now a constant-voltage load line such as shown at 20 in FIG. 3. As may also be seen from FIG. 3, the diode may be quiescently biased to operate in its low voltage state (intersection 22). With the tunnel diode so biased, the current drawn by the tunnel diode is relatively high and the current drawn by the transistor is insignificant (substantially zero). A negative output voltage (close to that of the power supply) appears at the collector of the transistor. A negative pulse 84 applied to terminal 46 switches the tunnel diode from its low voltage state to its high voltage state and also switches the transistor output current from its substantially zero value to a relatively high value. The inductance 82 continues to discharge its energy into the tunnel diode for a short interval of time so that the transistor output current remains high for a given interval of time. After the inductance has discharged its energy, the diode returns to its low voltage state and the transistor output current returns to substantially zero current. Thus, the circuit of FIG. 9 operates monostably and only negative pulses 84 need be applied to input terminals 46.

A typical circuit as shown in FIG. 7 may have the following circuit values.

| | Ohms |
|---|---|
| Resistor **50** | 1800 |
| Resistor **40** | 6200 |
| Resistor **34** | 1800 |

The total values may be as shown. The diode 42 may be one having a 5 milliampere peak *b* (see FIG. 3).

What is claimed is:

1. A monostable circuit comprising, in combination, a transistor having base, emitter, and collector electrodes; means for applying operating voltages to the transistor; a tunnel diode connected in parallel with the base-to-emitter diode of the transistor; a constant voltage source connected to the tunnel diode for quiescently biasing the tunnel diode to one of its positive resistance operating regions; and a source of input pulses connected to the tunnel diode for switching the diode to its other positive resistance operating region.

2. A bistable circuit comprising, in combination, a transistor having base, emitter, and collector electrodes; means for applying operating voltages to the transistor; a tunnel diode connected in parallel with the base-to-emitter diode of the transistor; a constant current source connected to the parallel circuit of said tunnel diode and base-to-emitter diode for applying a forward current to the tunnel diode and a reverse bias to the base-to-emitter diode; and means for applying alternate positive and negative pulses to the diode for switching it from one stable state to the other.

3. A bistable multivibrator comprising, in combination, a transistor having a base-emitter diode; a negative resistance diode connected in parallel with said base-emitter diode and having two stable operating states; means for supplying an operating voltage to said transistor; and means for forward biasing said negative resistance diode to a value such that said base-emitter diode is reverse-biased when the negative resistance diode is in one of its two stable states and is forward biased when the negative resistance diode is in the other of its two stable states.

4. In combination, a transistor having emitter, collector and base electrodes; connections for applying an operating voltage between said emitter and collector electrodes; a tunnel diode connected in parallel with said emitter and base electrodes; a substantially constant voltage source for quiescently biasing said tunnel diode in the higher current region of its low voltage state; and means for applying an input pulse to said tunnel diode for switching the tunnel diode to the lower current region of its high voltage state.

5. In combination, a transistor having emitter, collector and base electrodes; connections for applying an operating voltage between said emitter and collector electrodes; a tunnel diode connected in parallel with said emitter and base electrodes; means for quiescently biasing said tunnel diode in the higher current region of its low voltage state and at a level of voltage such that the base electrode of said transistor is reverse biased; and means for applying an input pulse to said tunnel diode for switching the tunnel diode to the lower current region of its high voltage state.

6. A monostable circuit comprising, in combination, a transistor having base, emitter and collector electrodes; a tunnel diode connected in parallel with the base-to-emitter diode of the transistor; an inductor; a constant voltage source connected through said inductor to the tunnel diode for quiescently biasing the tunnel diode to one of its positive resistance operating regions; and a source of input pulses connected to the tunnel diode for switching the tunnel diode to its other positive resistance operating region.

References Cited by the Examiner

Pub.: Electronics, Nov. 17, 1959, pp. 60–64.
Pub.: Electronics, Aug. 7, 1959, p. 61.
Pub.: Principles of Transistor Circuits, Shea, p. 164.
Pub.: Proc. IRE, July 1959, pp. 1201–6.

ARTHUR GAUSS, *Primary Examiner.*

GEORGE N. WESTBY, *Examiner.*

Disclaimer 3,229,113.—*George H. Wells*, Conshohocken, Pa. CIRCUITS OF THE MONOSTABLE AND BISTABLE TYPE EMPLOYING TRANSISTORS AND NEGATIVE RESISTANCE DIODES. Patent dated Jan. 11, 1966. Disclaimer filed Feb. 26, 1969, by the assignee, *Radio Corporation of America.*

Hereby enters this disclaimer to claims 1, 4 and 6 of the said patent.

[*Official Gazette May 27, 1969.*]